United States Patent
Eguchi

(10) Patent No.: US 6,869,062 B2
(45) Date of Patent: Mar. 22, 2005

(54) VALVE FOR DISCHARGING FLUID FROM A TANK

(75) Inventor: Kenzo Eguchi, Machida (JP)

(73) Assignee: Anzai Medical Kabushiki Kaisha, Tokyo (JP)

( * ) Notice: Subject to any disclaimer, the term of this patent is extended or adjusted under 35 U.S.C. 154(b) by 63 days.

(21) Appl. No.: 10/607,038

(22) Filed: Jun. 27, 2003

(65) Prior Publication Data

US 2004/0004202 A1 Jan. 8, 2004

(30) Foreign Application Priority Data

Jul. 3, 2002 (JP) ....................................... 2002-195044

(51) Int. Cl.⁷ .............................................. F16K 51/00
(52) U.S. Cl. ................... 251/149.5; 251/149.6
(58) Field of Search ........................... 257/149.5, 149.6

(56) References Cited

U.S. PATENT DOCUMENTS

| 4,070,003 A | * | 1/1978 | Shames et al. | .......... 251/149.6 |
| 4,612,953 A | * | 9/1986 | Caroll et al. | ............. 251/149.6 |
| 4,745,950 A | * | 5/1988 | Mathieu | .................. 251/149.6 |
| 5,018,552 A | | 5/1991 | Politi et al. | |
| 5,074,524 A | * | 12/1991 | Wade | ....................... 251/149.6 |
| 6,058,960 A | | 5/2000 | Kopp | |
| 6,691,978 B1 | * | 2/2004 | Bartos et al. | ............ 251/149.6 |

FOREIGN PATENT DOCUMENTS

| DE | 11 96 915 | 7/1965 |
| DE | 14 50 414 | 1/1970 |
| FR | 2 655 955 | 6/1991 |
| JP | 64-55290 | 4/1989 |
| JP | 4-116396 | 4/1992 |
| JP | 8-338595 | 12/1996 |

* cited by examiner

Primary Examiner—John Bastianelli
(74) Attorney, Agent, or Firm—Paul A. Guss

(57) ABSTRACT

A valve has a cylindrical body made of a metal material, a screw section formed on a first attachment hole in the body, a first seal member provided on an upper surface of the body, a third seal member attached to an upper surface of the first attachment hole, a valve plug arranged in a second attachment hole for being seated on a valve seat, a flange section curved outwardly from an outer circumferential surface of the body, and a spring interposed between the valve plug and a spring-receiving member provided in the second attachment hole.

5 Claims, 4 Drawing Sheets

VALVE FOR DISCHARGING FLUID FROM A TANK

BACKGROUND OF THE INVENTION

1. Field of the Invention

The present invention relates to a valve, e.g., attached to an opening of a tank in which a fluid is sealed. The valve is operated to discharge the fluid from the tank by opening/closing a valve plug.

2. Description of the Related Art

A valve has been hitherto generally used to open/close an opening of a tank in which a fluid (for example, xenon gas) is sealed. The valve comprises a body which is connected to an upper end of the tank, a spring which is attached in the body, a valve plug which is displaceable by the spring, and a valve seat on which the valve plug is seated. The valve plug is seated on the valve seat by the spring force, and thus the fluid is kept in the tank gas-tightly. When the valve plug is pressed against the resilient force of the spring, the valve is opened, in which the fluid in the tank is discharged outside.

In the conventional valve as described above, the valve plug is seated on the valve seat by the resilient force of the spring to keep the fluid in the tank gas-tightly. However, it is demanded to secure the gas-tightness for the fluid even when the fluid in the tank is discharged by opening the valve plug.

SUMMARY OF THE INVENTION

A general object of the present invention is to provide a valve which makes it possible to prevent a fluid in a tank from leaking outside, by using first and second seal members for keeping the gas-tightness of a fluid passage before a valve plug is separated from a valve seat.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
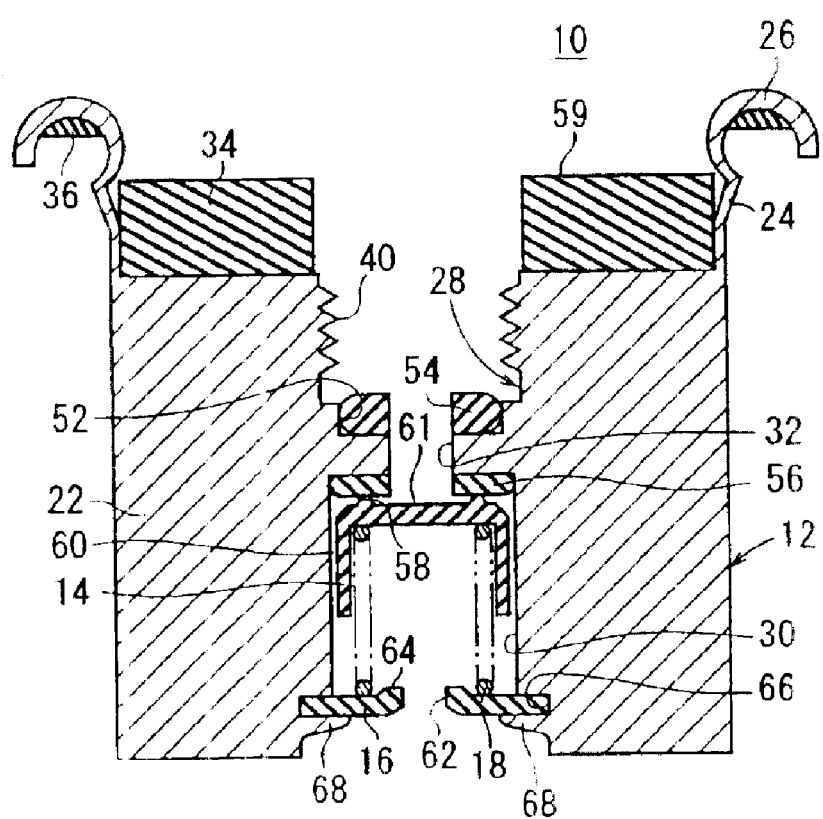
FIG. 1 is a vertical sectional view illustrating a valve according to an embodiment of the present invention.

With reference to FIG. 1, reference numeral 10 indicates a valve according to an embodiment of the present invention.

The valve 10 comprises a body 12 which has a substantially cylindrical shape, a valve plug 14 which is arranged displaceably in an axial direction in the body 12, and a spring 18 interposed between the valve plug 14 and a spring-receiving member 16 provided at a lower portion of the body 12.

The body 12 is made of a metal material (for example, aluminum). The body 12 includes a main section 22 which has a substantially cylindrical shape, an inclined section 24 which extends while inclining by a predetermined angle upwardly from the outer circumferential surface of the main section 22, and a flange section 26 which is curved radially outwardly from the inclined section 24 and which has a substantially semicircular cross section. A first attachment hole 28 is provided in a substantially central and upper portion of the main section 22 along the axial direction thereof. A second attachment hole 30 is formed under the first attachment hole 28. The first attachment hole 28 and the second attachment hole 30 are communicated with each other by a communication hole 32. An annular first seal member 34 made of an elastic material is arranged on the upper surface of the main section 22.

Figure 2:
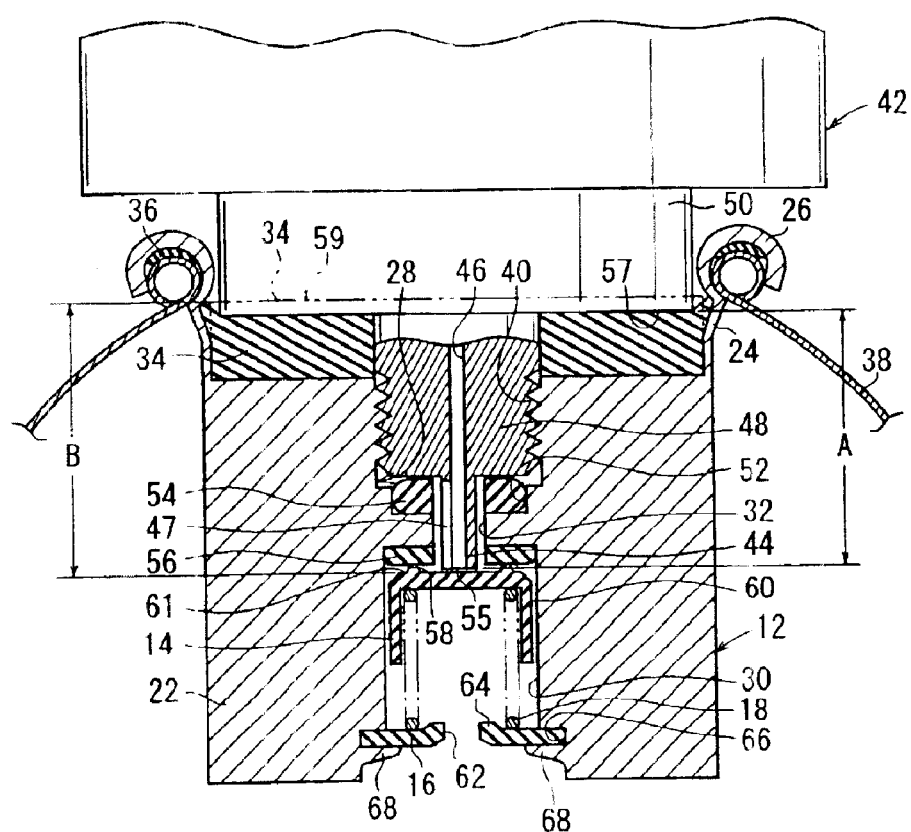
FIG. 2 is a vertical sectional view when the valve is closed.
Figure 3:
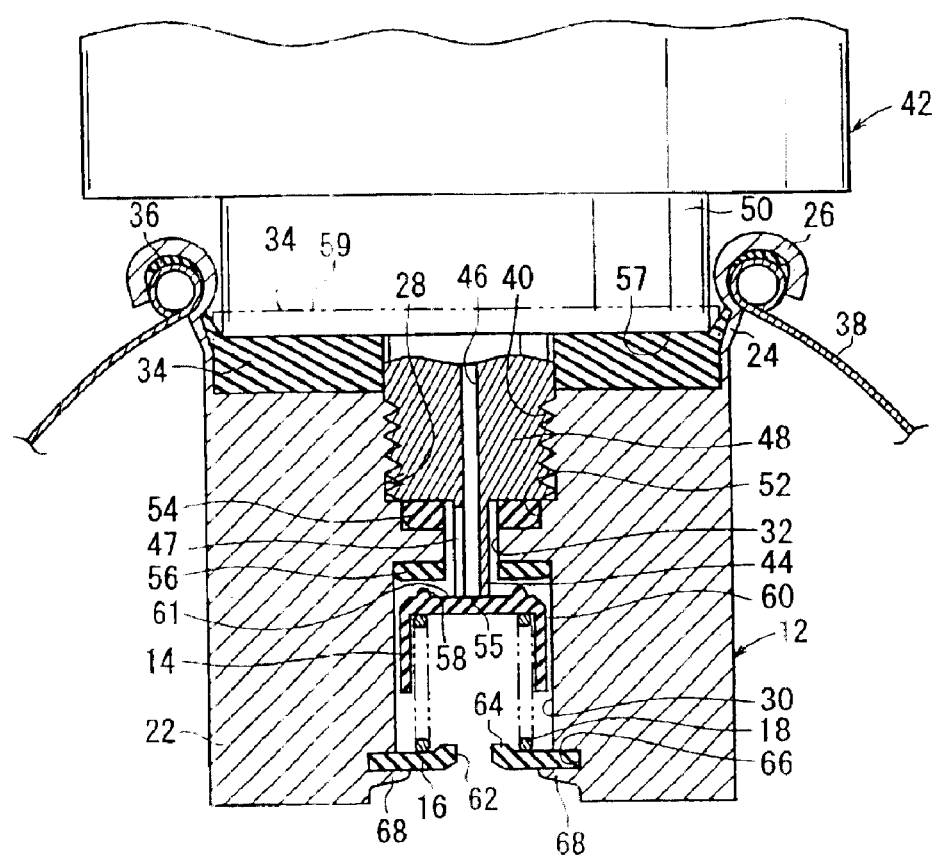
FIG. 3 is a vertical sectional view when the valve is opened.
Figure 4:
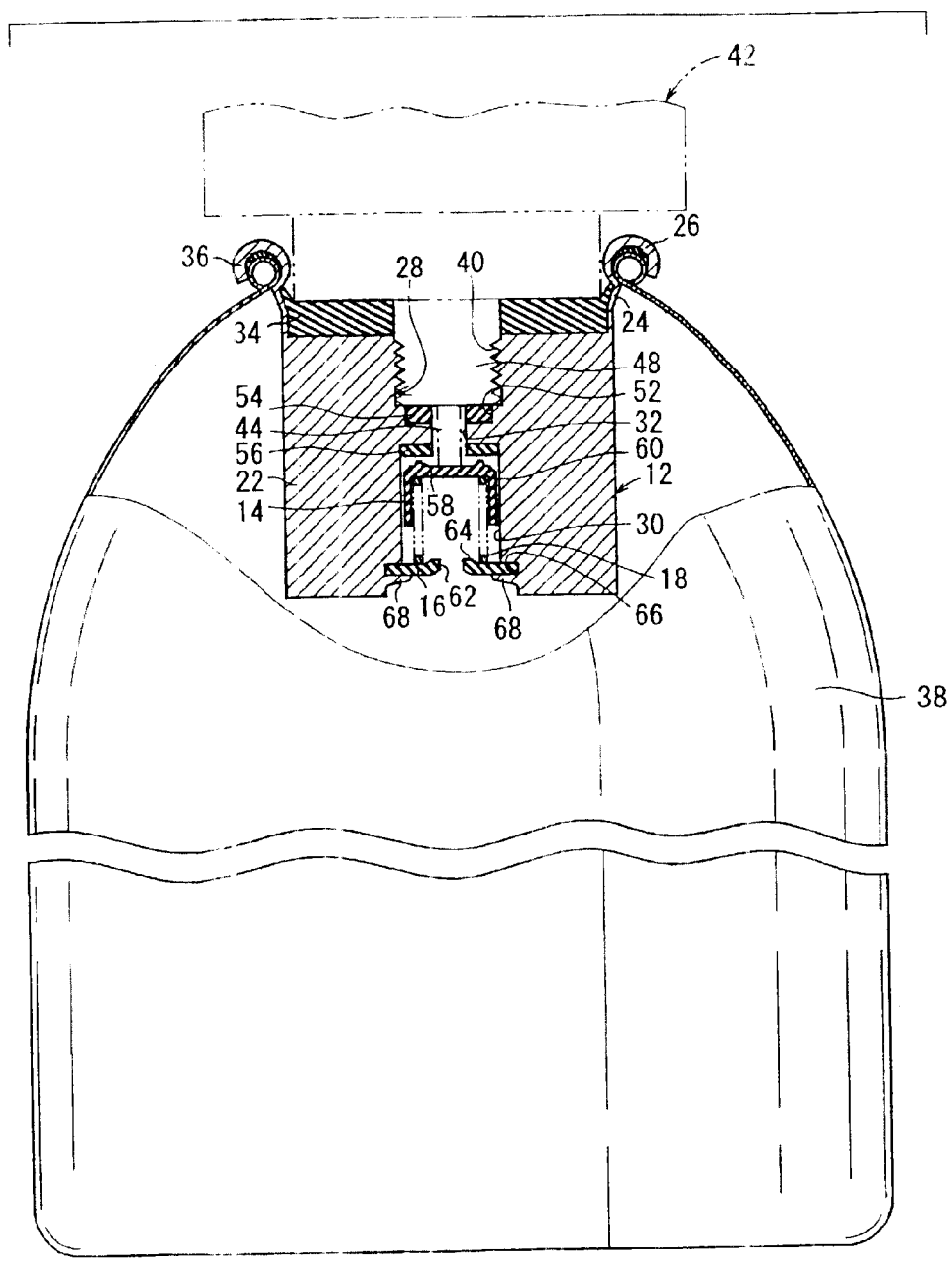
FIG. 4 is a vertical sectional view in which the valve is attached to an upper end of a tank.

The inclined section 24 is inclined radially outwardly. An annular second seal member 36 is attached in the flange section 26 which is continued and curved from the inclined section 24. When the flange section 26 is fixed on an upper end of a tank 38 (see FIG. 4) in which a fluid (for example, xenon gas) is sealed, the second seal member 36 made of an elastic material is interposed between the flange section 26 and the upper end of the tank 38 as shown in FIGS. 2 and 3.

A screw section 40 is formed on the inner circumferential surface of the first attachment hole 28. A screw section 48 of a connecting plug (connecting member) 42 connected to an unillustrated tube as described later on is screwed with the screw section 40.

The connecting plug 42 is formed of a metal material. The connecting plug 42 has a cylindrical pin section 44 on one end. The cylindrical pin section 44 protrudes by a predetermined length. The end of the connecting plug 42 having the cylindrical pin section 44 is attached to the body 12. A communication passage 46 is formed in the axial direction in the pin section 44. The communication hole 32 and the communication passage 46 are communicated with each other through a slit 47 axially formed in the outer circumferential surface of the pin section 44. The outer diameter of the pin section 44 is smaller than the inner diameter of the communication hole 32 of the body 12.

The screw section 48 is integrally formed on the pin section 44 of the connecting plug 42. The screw section 48 has a diameter widened radially outwardly as compared with the pin section 44. A screw is formed on the outer circumferential surface of the screw section 48 to be screwed with the screw section 40 of the body 12.

A large diameter section 50 having a further widened diameter as compared with the screw section 48 is provided on the screw section 48 of the connecting plug 42. The communication passage 46 penetrates from the pin section 44 to the large diameter section 50. The communication passage 46 is further communicated with the unillustrated tube which is connected on the other end of the connecting plug 42. The outer diameter of the large diameter section 50 has substantially the same dimension as or slightly smaller than that of the diameter of the first seal member 34.

A first stepped section 52 having a diameter reduced radially inwardly as compared with the first attachment hole 28 is formed between the first attachment hole 28 and the communication hole 32. An annular third seal member 54 made of an elastic material is attached to the first stepped section 52. The outer circumferential surface of the third seal member 54 has a substantially semicircular cross section. The inner circumferential diameter thereof has substantially the same dimension as that of the communication hole 32.

As shown in FIG. 2, the distance A between the end surface (second end surface) 55 of the pin section 44 and the lower surface (first end surface) 57 of the large diameter section 50 is smaller than the distance B between the upper surface (first abutment surface) 59 of the first seal member 34 and the upper surface (second abutment surface,) 61 of the valve plug 14 (A<B). That is, the pin section 44 does not abut on the upper surface 61 of the valve plug 14 when the lower surface 57 of the large diameter section 50 abuts on the upper surface 59 of the first seal member 34.

An annular valve seat 56 on which the valve plug 14 is seated is attached to the upper surface of the second attachment hole 30. The valve seat 56 is made of an elastic member, and the inner diameter of the valve seat 56 is substantially the same as the communication hole 32. Therefore, the fluid in the tank 38 is not obstructed when the fluid flows through the communication hole 32.

The valve plug 14 made of a metal material has a bottomed cylindrical shape having a substantially U-shaped cross section. An annular seating section 58 protruding by a predetermined length is formed on the upper surface of the valve plug 14. The valve plug 14 is displaceable in the axial direction in the second attachment hole 30. When the seating section 58 is seated on the valve seat 56, the communication hole 32 of the body 12 is closed. There is a clearance 60 of a predetermined distance between the outer circumferential surface of the valve plug 14 and the inner circumferential surface of the second attachment hole 30.

The spring 18 is interposed between the inner portion of the valve plug 14 and the upper surface of the spring-receiving member 16. The spring 18 is urged upwardly so that the valve plug 14 is seated on the valve seat 56.

A hole 62 is formed at a substantially central portion of the annular spring-receiving member 16, through which the fluid flows when the valve 10 is connected to the tank 38. A bent section 64 is formed in the vicinity of the hole 62 of the spring-receiving member 16, and is slightly bent upwardly. That is, when one end of the spring 18 is attached to the upper surface of the spring-receiving member 16, the bent section 64 prevents the spring 18 from being released undesirably.

The spring-receiving member 16 is engaged with a second stepped section 66 having a diameter widened radially outwardly at the lower part of the second attachment hole 30. A projection 68 protruding radially inwardly is formed by upwardly pressing the inner circumferential surface of the second attachment hole 30 with an unillustrated jig or tool. The spring-receiving member 16 is held between the projection 68 and the second stepped section 66. Therefore, the spring-receiving member 16 is fixed to the body 12.

The valve 10 according to the embodiment of the present invention is basically constructed as described above. Next, its operation, function, and effect will be explained. In the explanation, it is assumed that in an initial state the valve 10 is attached to the upper end of the bottomed tank 38 in which the fluid (for example, xenon gas) is sealed, the seating section 58 of the valve plug 14 is seated on the valve seat 56, and the fluid in the tank 38 has not been discharged yet.

When the tank 38 is attached to the connecting plug 42 which is fixed, for example, on an unillustrated wall surface, the tank 38 is rotated to be connected with the connecting plug 42. In particular, the screw section 40 of the first attachment hole 28 of the valve 10 attached to the tank 38 is screwed with the screw section 48 of the connecting plug 42. When the screw section 48 is screwed with the screw section 40 of the first attachment hole 28, the tank 38 is displaced in a direction toward the connecting plug 42. Alternatively, the tank 38 may be fixed, and the connecting plug 42 may be rotated to be connected with the tank 38.

As shown in FIG. 2, the lower surface 57 of the large diameter section 50 of the connecting plug 42 abuts on the upper surface 59 of the first seal member 34 of the body 12 as the tank 38 is displaced in the axial direction. When the tank 38 is further displaced, the first seal member 34 is pressed by the large diameter section 50 by a predetermined length in the axial direction. As a result, the first seal member 34 is deformed along the inclined section 24 and the upper surface of the main section 22.

At that time, the end surface 55 of the pin section 44 does not abut on the upper surface 61 of the valve plug 14. Therefore, the seating section 58 of the valve plug 14 is seated on the valve seat 56 to block the flow of the fluid in the tank 38.

The gas-tightness is retained by the first seal member 34 in the first attachment hole 28 and the second attachment hole 30, before the valve plug 14 is separated from the valve seat 56 to discharge the fluid in the tank 38.

As shown in FIG. 3, when the tank 38 is further rotated, the tank 38 is further displaced in the direction toward the connecting plug 42. Accordingly, the end surface 55 of the pin section 44 abuts on the upper surface 61 of the valve plug 14, and the valve plug 14 is pressed downwardly against the spring force.

The lower surface of the screw section 48 contacts the upper surface of the third seal member 54 substantially simultaneously, or slightly earlier than the pressing action of the end surface 55 on the upper surface 61 of the valve plug 14.

As a result, the seating section 58 of the valve plug 14 is separated from the valve seat 56. Accordingly, the fluid in the tank 38 flows into the communication hole 32 through the internal clearance of the second attachment hole 30 from the hole 62 of the spring-receiving member 16. The fluid in the communication hole 32 is discharged to the unillustrated tube through the communication passage 46 via the slit 47 of the pin section 44.

In this situation, the fluid in the tank 38 does not flow from the communication hole 32 to the first attachment hole 28 since the flow is blocked by the third seal member 54. Therefore, the fluid can be prevented from leaking outside, which would be otherwise caused through the first attachment hole 28 communicating with the communication hole 32. Further, the first attachment hole 28 is also closed by the first seal member 34 and the large diameter section 50 of the connecting plug 42. Therefore, the fluid can be reliably prevented from leaking outside.

Next, when the tank 38 is detached from the connecting plug 42, the tank 38 is rotated in a direction opposite to the direction for attaching to the tank 38. Accordingly, the tank 38 is displaced in a direction to separate from the connecting plug 42, unscrewing the screw section 40 of the body 12 of the valve 10 from the screw section 48 of the connecting plug 42.

The pin section 44 is separated from the upper surface 61 of the valve plug 14, and thus the valve plug 14 is pressed upwardly by the spring force of the spring 18. Accordingly, the seating section 58 of the valve plug 14 is seated on the valve seat 56. As a result, the flow of the fluid is blocked, and the fluid does not flow from the tank 38 through the clearance 60 between the second attachment hole 30 and the valve plug 14.

Even when the tank 38 is completely detached from the connecting plug 42, the seating section 58 of the valve plug 14 is pressed upwardly by the spring force of the spring 18 to keep the seating section 58 seated on the valve seat 56.

Accordingly, the fluid in the tank 38 does not leak outside. Thus, the gas-tightness in the tank 38 is reliably secured.

As described above, in the valve 10 according to the embodiment of the present invention, the first seal member 34 is provided on the upper surface of the main section 22 of the body 12, and the third seal member 54 is provided between the first attachment hole 28 and the communication hole 32. As a result, the large diameter section 50 of the connecting plug 42 is pressed by the first seal member 34, before the valve plug 14 is separated from the valve seat 56. Therefore, the fluid is prevented from leaking outside.

When the valve plug 14 is pressed by the pin section 44 and separated from the valve seat 56, the gas-tightness of the fluid is kept by the first seal member 34 as well as the third seal member 54. Accordingly, the fluid in the tank 38 can be reliably prevented from leaking outside.

Further, the second seal member 36 is held between the flange section 26 and the upper end of the tank 38 when the flange section 26 engages with the upper end of the tank 38 in which the fluid is sealed. Thus, the fluid in the tank 38 is prevented from leaking outside.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A valve attached to an opening of a tank in which a fluid is sealed, for discharging said fluid in said tank outside via a connecting member connected to a tube, said valve comprising:

a body having a substantially cylindrical shape and having a through-hole disposed at a central portion of said body;

a first seal member provided on one end surface of said body;

a valve plug provided in said through-hole and being seated on a valve seat by spring force of a spring; and a second seal member provided in said through-hole, said connecting member having a first end surface for abutting on said first seal member and a second end surface for abutting on said valve plug, wherein a distance between said first end surface and said second end surface of said connecting member is smaller than a distance between a first abutment surface of said first seal member for abutting on said connecting member and a second abutment surface of said valve plug.

2. The valve according to claim 1, wherein a seating section protruding in a direction toward said valve seat is formed on one surface of said valve plug opposing to said valve seat.

3. The valve according to claim 1, wherein said through-hole communicates with a communication passage formed in said connecting member through a slit formed in an end of said connecting member for pressing said valve plug.

4. The valve according to claim 1, wherein each of said first and second seal members is made of an elastic material.

5. The valve according to claim 1, wherein a flange section is formed on an outer circumference of said valve, and said flange section is fixed on said opening of said tank.

* * * * *